G. POLLARD.
ELECTROMAGNETIC FRICTION BRAKE MORE ESPECIALLY INTENDED FOR THE DRIVING AND CHANGE SPEED GEAR OF MOTOR ROAD VEHICLES.
APPLICATION FILED SEPT. 3, 1918.
1,334,791. Patented Mar. 23, 1920.
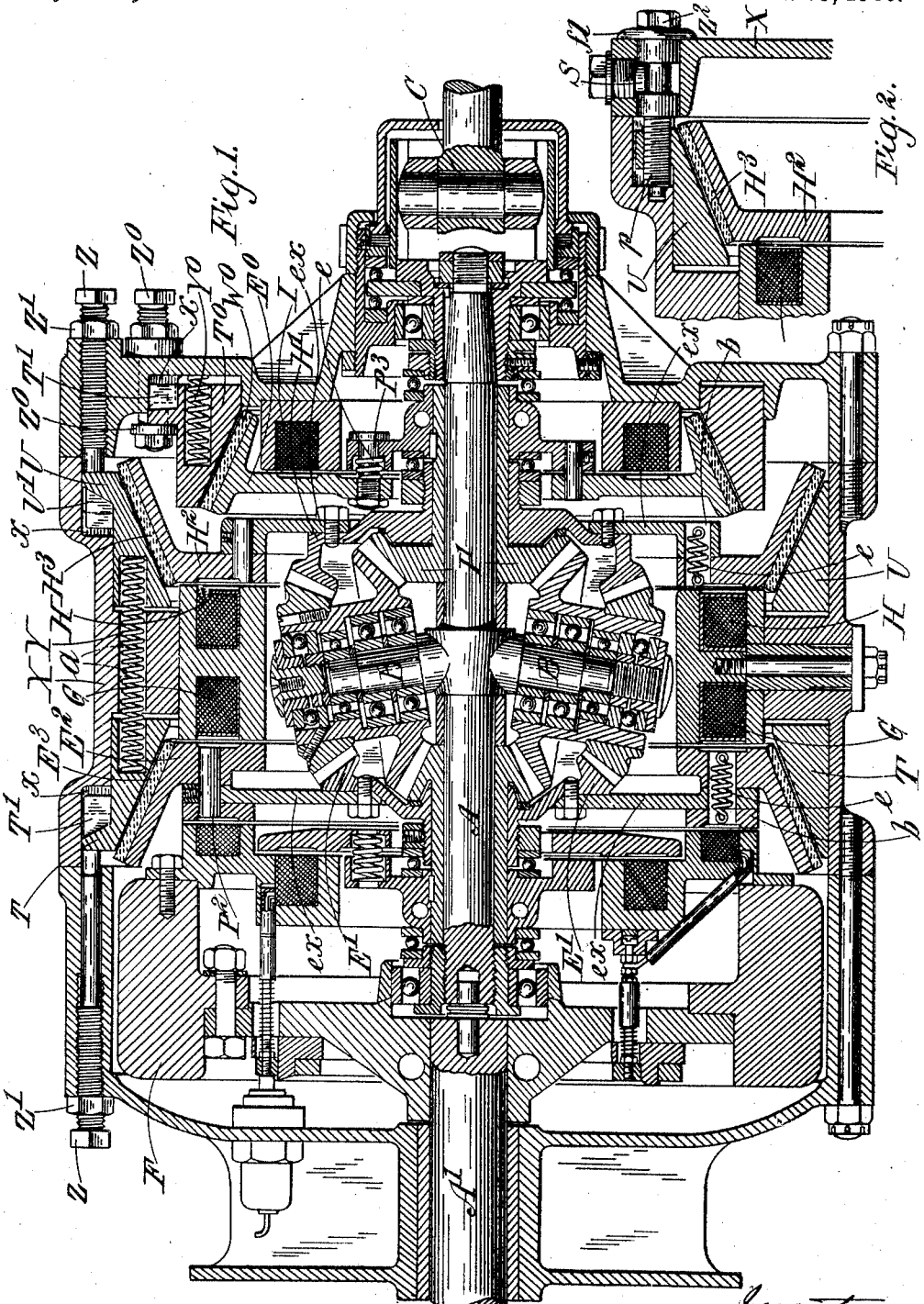

UNITED STATES PATENT OFFICE.

GEORGE POLLARD, OF LONDON, ENGLAND, ASSIGNOR TO THE MENCO-ELMA SYNDICATE LIMITED, OF LONDON, ENGLAND.

ELECTROMAGNETIC FRICTION-BRAKE MORE ESPECIALLY INTENDED FOR THE DRIVING AND CHANGE-SPEED GEAR OF MOTOR ROAD-VEHICLES.

1,334,791.          Specification of Letters Patent.     Patented Mar. 23, 1920.

Application filed September 3, 1918. Serial No. 252,434.

*To all whom it may concern:*

Be it known that I, GEORGE POLLARD, a subject of the King of England, residing in London, England, have invented certain new and useful Improvements in Electro-Magnetic Friction-Brakes More Especially Intended for the Driving and Change-Speed Gear of Motor Road-Vehicles, of which the following is a specification.

This invention relates to electro-magnetic friction-brakes for preventing and permitting the motion of gear-wheels in a certain type of driving and change-speed gear of motor road-vehicles hereinafter more particularly referred to.

The principal object of the construction of electro-magnetic brake that is combined according to the present invention with the aforesaid type of driving and change-speed gear is that it may operate with certainty and uniformity to produce in such combination a strong braking action while needing for its operation small and light electro-magnets, and but a small expenditure of current in the latter; the brake is of the kind which comprises an armature movable magnetically in relation to the electro-magnet in the brake and with a friction surface fixed to said armature, employed in combination with a coöperating brake-element which not only stops the rotation of the said friction-surface in relation to it (being for instance held against rotation in, say, the fixed casing of the gear) but is provided with means whereby it is adjustable toward and away from the face of the electro-magnet for the purposes hereinafter described. This combination enables the gap between the armature and magnet-faces to be increased or reduced as may be required, in a manner well known, so that with the braking surfaces home against one another the desired relationship between the armature and magnet faces to secure electromagnetic efficiency concurrently with the desired degree of braking can easily be brought about and maintained, despite wear of the braking surfaces in relation to one another and despite errors of workmanship or of erection such as might lead to the braking-surfaces being initially either too far apart or too near to one another.

Electro-magnetic friction-brakes of the kind above referred to are applied according to the present invention to a known type of beveled-wheel electro-magnetic epicyclic speed-changing gear wherein there is a single driven shaft, to be connected for example to the road-wheels of a motor-vehicle, a planetary shaft fixed to the driven shaft so as to rotate therewith, sun-gears loose and turning co-axially with the said driving and driven shafts, and also planet-gears loose on said planetary shaft and attached to or inter-connected with one another and engaging the sun-gears, the power being taken out of this gear at various velocity-ratios by way of the single driven shaft and the planetary shaft. Examples of such speed-changing, reversing and braking gearing can be found in the specifications of prior British Letters Patent No. 1853 of 1912 granted to G. L. A. Perret, No. 9557 of 1914 granted to G. W. Johnson, and in the specifications of applications for British Letters Patent of Pollard and The Menco-Elma Syndicate Limited No. 110020, No. 11712 of 1917 and No. 12273 of 1917.

Reference will now be made to the accompanying drawings, in which:—

Figure 1 shows in longitudinal central section a speed-changing and reverse gear of the type indicated above with electromagnetic friction brakes combined therewith according to the present invention;

Fig. 2 shows a part of Fig. 1 modified as hereinafter explained.

Like reference-letters indicate like parts throughout the drawings.

With reference first to Fig. 1:—The gear comprises a driven shaft A and arms B which intersect the driven shaft at an angle other than a right angle. The arms B receive motion from a suitable motor (not shown) which actuates the driving-shaft $A^1$ on which the fly-wheel F is fixed, and the arms transmit this motion to the driven shaft A controlling the road-wheel of the vehicle through the medium of a Cardan joint C. It is not necessary for the purposes of the present invention to explain how the various velocity-ratios of A in relation to that of $A^1$ can be changed according to earlier specifications, and it suffices to say only that various changes in the velocity-ratio transmitted, comprising a reversal of the driven shaft, can be obtained by means of three circular stationary electro-magnets, G, H and I fixed to the stationary casing of the gear for the purpose of holding stationary when required, the sun-wheels $E^1$, $H^1$ and $I^1$ to which the electro-magnets G, H and I are respectively allotted.

Dealing first with the two stationary circular electro-magnets G and H, they are combined with two coned circular brake-elements T and U held against rotation in the fixed casing X of the gear but each movable endwise therein, that is to say movable along the axial line thereof, about which the electro-magnets, the brake-elements and the coöperating coned friction surfaces hereinafter referred to are all coaxial. To guide these brake-elements T and U in their endwise movement in the casing X and to keep them from turning there are feathers $T^1$ $U^1$ fixed to the back of the brake-elements and made to be a sliding fit in recesses $x$ lying lengthwise in the wall of the casing X.

In compression between the two coned brake-elements are springs such as Y, tending always to keep them away from each other. Screwed through the exterior of the casing are in threaded holes therein stops such as Z to regulate the position to which the springs Y can move the said coned brake-elements. These stops can be screwed in or out and can be locked securely by means of lock-nuts $Z^1$ in the different positions to which they are adjustable. The springs Y and stops Z are spaced apart at equal angular intervals around the axis of the shaft A.

Two armatures $E^2$ and $H^2$ are appropriated respectively to the magnets G and H. Each armature is provided with a spring such as $e$ (see the lower part of Fig. 1) in tension between it and a suitable pin or abutment $b$ on an extension $ex$ from the sun-wheel $E^1$ (or $H^1$) to which the armature is allotted as hereinafter explained. Each of these springs tends to keep the armature away from its electro-magnet. The armature $E^2$ slides on fixed pins $P^2$ borne on the extension $ex$ from the sun-wheel $E^1$ to which wheel that armature is alloted, and the armature $H^2$ is similarly connected by similar pins to an extension $ex$ from the sun-wheel $H^1$. Consequently each armature can turn with but not in relation to its sun-wheel and is also movable endwise, i. e. lengthwise of the casing X in relation thereto.

On the armature $E^2$ is fixed a coned friction-surface $E^3$ and on the armature $H^2$ is fixed a similar but oppositely-coned friction-surface $H^3$. Endwise movements of the armatures will bring these friction surfaces $E^3$ and $H^3$ into and out of contact with the coöperating brake-elements T and U.

Attached to an extension from the sun-wheel $I^1$ to be controlled by the stationary electro-magnet I is an endwise-movable armature $E^0$ on sliding pins $P^2$, with an attached friction surface $W^0$, and in the casing in proximity to the said friction-surface is a slidable but non-rotatable coned brake-element $T^0$ with a spring $Y^0$ thrusting it toward an adjustable stop $Z^0$. This device is virtually one half of a duplex brake-mechanism such as has been illustrated in relation to the electro-magnets G and H.

The action of the electro-magnetic friction-brake will now be described with reference to the parts G, $E^2$, $E^3$ and T. A precisely similar action takes place under the operation of the other electro-magnets and therefore will not need to be herein described. So long as no current passes through the electro-magnet G, the spring $e$ will hold the armature $E^2$ and friction-surface $E^3$ at the left-hand limit of its endwise movement in the extension from the sun-wheel $E^1$. But when the electro-magnet G is energized, the armature $E^2$ will be drawn magnetically toward it and there will be a corresponding movement of the coned friction surface $E^3$ appropriated to that armature, toward the coned brake-element T that faces it, the part $E^3$ coming into contact with and being held frictionally by the part T against rotation.

It is not only necessary that the face of the armature $E^2$ should come, at the finish of this approach movement, into a position of nearness to the face of the electro-magnet G, but also more particularly that the degree of this nearness should be regulatable precisely while the parts $E^3$ T are kept in contact. This can readily be effected by the adjustable stop Z. For instance, if when the coned friction surface $E^3$ and the contiguous brake-element T are being magnetically pulled against one another, the face of the armature $E^2$, owing to mal-adjustment of the surfaces of $E^3$ and T, or owing to their wear, is not near enough to that of the electromagnet G, or if, on the other hand, it is too near to it, then the stop Z can be adjusted in or out as the case may be, and the parts T, $E^3$ and $E^2$ will thereupon move in company. It is by the movement of these three parts in company under the joint action of spring Y and adjustable stop Z that the gap between the armature and magnet-faces can be increased or reduced, as may be required. The gap can be reduced to zero if the opposed faces of the armature $E^2$ and electro-magnet G are required to act as braking-surfaces when the parts $E^3$ T are also abutting.

Although the springs Y extend between opposite brake-elements, there might be an abutment *a* such as is shown in chain-lines in the drawing, extended inward from the casing X and constituting an abutment for separate springs which might then be considered as formed by two separated halves of the original spring Y. The advantage of the construction which employs a single spring between the two coned brake-elements is that it enables a long spring to be used; the two coned brake-elements are not in practice operated upon simultaneously, and consequently therefore when either one of them is used, it utilizes the whole length of the spring which at such time rests against the other as an abutment.

In Fig. 2 the aforesaid springs Y are dispensed with, and the brake-element U, such as is employed in Fig. 1, is adjustable lengthwise of the casing X, kept from rotating therein as in Fig. 1, and is held in its lengthwise position by an adjusting-device $Z^2$ which is a rotatably screwed spindle held from endwise movement in a hole in the end of the casing X by the stud S and flange *f*, and engaging by the screw-threaded portion *p* of the spindle a tapped hole in the part U.

Although in the foregoing description T and $E^3$ have coned coöperated surfaces, the advantages of the invention with regard to the convenience of adjustment of the parts T, $E^3$ and $E^2$ in company in relation to the electro-magnet G would remain if the surfaces of the parts T and $E^3$ were radial to the axis of the shafts $A^1$ and A instead of conical.

What I claim as my invention and desire to secure by Letters Patent is:—

1. In a bevel-wheel electro-magnetic epicyclic speed changing gear of the class described, the combination of two non-rotating circular brake elements, springs bearing on the two elements to thrust them away from one another, regulating stops to regulate the position to which said springs can move the brake elements, fixed electro-magnets, bevel sun gears, and armature elements, and friction surface elements turning with said bevel sun gears, and springs tending to keep said elements away from the electro-magnets.

2. In a bevel-wheel electro-magnetic epicyclic speed-changing gear of the class described, the combination of a non-rotating circular brake element, springs bearing on it to thrust it away from its support, a regulating-stop to regulate the position to which said springs can move the brake element, a fixed electro-magnet, a bevel sun-gear, and armature element and friction-surface element turning with said bevel sun-gear and springs tending to keep said elements away from the electro-magnet.

3. In a bevel-wheel electro-magnetic epicyclic speed-changing gear of the class described, the combination of a non-rotating circular brake-element, a rotatable screw in threaded engagement with it to adjust it toward and away from its support, means which are situated in the support and engage said rotatable screw to prevent the latter from moving lengthwise, a fixed electro-magnet, and a rotatable armature element and rotatable friction-surface element that turns with the said rotatable armature-element.

4. In a bevel-wheel electro-magnetic epicyclic speed-changing gear of the class described, the combination of two non-rotating circular conical brake elements, springs bearing at their opposite ends on the two elements to thrust them away from one another, regulating screw stops to regulate the position to which said springs can move the brake elements, fixed electro-magnets, bevel sun gears, and armature elements, and coned friction surface elements turning with said bevel sun gears, and springs tending to keep said elements away from the electro-magnets.

In testimony whereof I have signed my name to this specification in the presence of two subscribing witnesses.

GEORGE POLLARD.

Witnesses:
JOHN EARLE,
H. BUGBIRD.